April 7, 1931.  E. F. BEUGLER  1,799,841
BARREL CHAMFERING, CROZING, AND TRIMMING APPARATUS
Original Filed Jan. 31, 1927   5 Sheets-Sheet 1

Inventor
Edwin F. Beugler
By Papp & Powers
Attorneys

April 7, 1931. E. F. BEUGLER 1,799,841
BARREL CHAMFERING, CROZING, AND TRIMMING APPARATUS
Original Filed Jan. 31, 1927 5 Sheets-Sheet 2

Inventor
Edwin F. Beugler
By Pope & Powers
Attorneys

April 7, 1931.    E. F. BEUGLER    1,799,841
BARREL CHAMFERING, CROZING, AND TRIMMING APPARATUS
Original Filed Jan. 31, 1927    5 Sheets-Sheet 4

Patented Apr. 7, 1931

1,799,841

UNITED STATES PATENT OFFICE

EDWIN F. BEUGLER, OF BUFFALO, NEW YORK, ASSIGNOR TO E & B HOLMES MACHINERY CO., OF BUFFALO, NEW YORK, A CORPORATION OF NEW YORK

BARREL CHAMFERING, CROZING, AND TRIMMING APPARATUS

Original application filed January 31, 1927, Serial No. 164,676. Patent No. 1,723,838. Divided and this application filed May 15, 1929. Serial No. 363,299.

This invention relates to a machine for making slack barrels having a body composed of an annular row of longitudinal staves, the opposite ends of which are adapted to be trimmed and provided on their inner sides with crozes for receiving the edges of the barrel heads, and chamfered faces between said crozes and trimmed ends whereby the heads are guided toward the crozes upon assembling the parts.

It is the purpose of this invention to provide improved means for trimming the ends of the staves and also forming the crozes and chamfers thereon in an efficient, expeditious and economical manner.

This is a division of an application filed January 31, 1927, Ser. No. 164,676 now Patent No. 1,723,838.

In the accompanying drawings.

Similar characters of reference indicate corresponding parts in the several figures of the drawings.

In its general organization this barrel making machine comprises means for setting up the staves in the form of a barrel preparatory to drawing them together; windlassing means for drawing the staves of the barrel together into the form of a tubular body or shell; means for driving or trussing the hoops on the body or shell of the barrel after the latter has been heated; means for producing the croze or chine, and chamfer on the ends of the barrel and trimming off these ends; and means for driving these several mechanisms and controlling the operation of the same.

Stave setting up mechanism

The staves 50 of this barrel shell or body are tapered from their side central parts toward their opposite ends, similar to those now commonly employed in slack cooperage. The mechanism whereby a plurality of such staves are set up and drawn together in the form of a shell can be of any usual and well known construction, such as by a windlassing mechanism having a windlassing rope adapted to embrace the staves of the barrel and draw them together into the form of a barrel shell.

Figure 3:
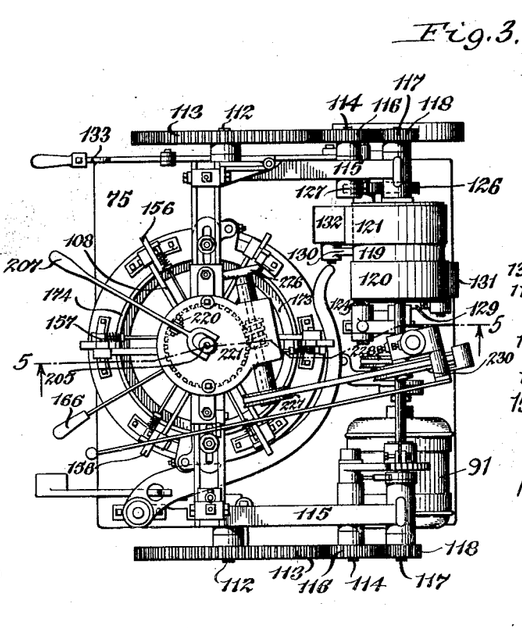
Fig. 3 is a top plan view of the machine.
Figure 4:
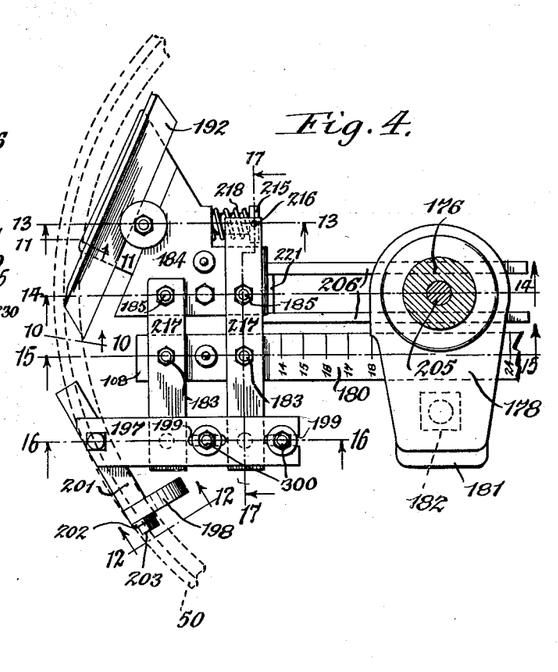
Fig. 4 is a plan view of the cutter mechanism on an enlarged scale.
Figure 5:
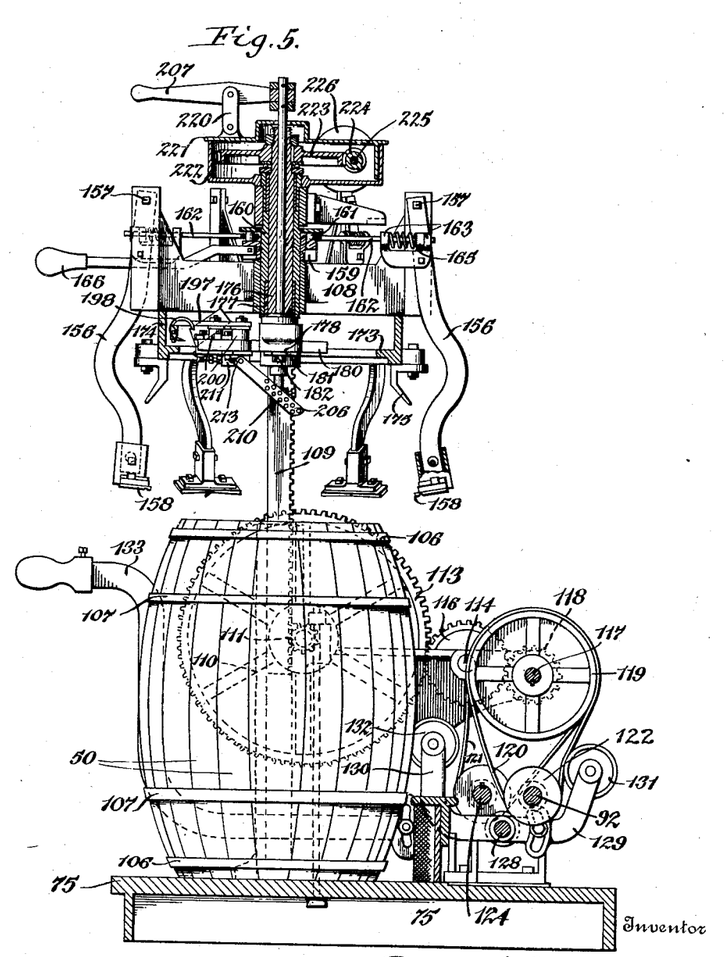
Fig. 5 is a vertical longitudinal section on an enlarged scale, taken on line 5—5, Fig. 3, showing the parts in their inoperative position.

After the upper ends of the staves of the barrel have been drawn together or contracted by the windlassing mechanism so that the shell or body of the barrel is of substantially tubular form, but having a bilge in its center, the operator places a temporary or trussing end hoop 106 on this end of the shell before releasing the windlassing rope and then loosely applies a permanent bilge hoop 107 upon the end of the shell or body adjacent to the bilge thereof. The shell having the temporary end hoop and the permanent bilge hoop applied thereto is then placed in an upright position with one end resting on the base 75 of the machine in proper position relative to the hoop trussing or driving mechanism which is constructed as follows:

Arranged above that part of the base supporting the barrel to be trussed is a vertically movable cross head 108 which is secured on opposite sides to the upper ends of two vertically movable gear racks 109. The latter are guided at their lower ends in tubular columns 110 which rise from the base on opposite sides of the barrel body or shell supported on the base. These gear racks together with the parts mounted thereon are caused to rise and fall by a lifting mechanism which comprises gear pinions 111 meshing with the gear racks 109 and mounted on short shafts 112 which are journaled on the upper ends of the columns 110, as best shown in Figs. 3 and 5; gear wheels 113 secured to the shafts 112; intermediate shafts 114 journaled in upright side pieces 115 of the main frame and provided with intermediate or gear wheel pinions 116 meshing with the gear wheels 113 respectively; and a transverse equalizing shaft 117 journaled in suitable bearings on the side pieces 115 and provided at opposite ends with gear pinions 118 which mesh respectively with the intermediate gear pinion 116; and means for causing the equalizing shaft 117 to be turned alternately in opposite directions by motion derived from the motor shaft 92.

The mechanism whereby the transverse equalizing shaft 117 is thus caused to turn alternately in opposite directions while the motor shaft turns continuously in the same direction, may be of any approved form, that shown in the drawings—see particularly Figures 1, 3, 5, and 6 being constructed as follows:

The numeral 119 represents a wide belt pulley secured to the transverse shaft 117 and 120 and 121 represent two driving belts passing around opposite ends of this wide driven pulley 119, the opposite turn of the belt 120 passing around a driving pulley 122 on the motor shaft 92, while the opposite turn of the driving belt 121 passes around a driving pulley 123 which is secured to a counter shaft 124 journaled in suitable bearings on the adjacent part of the main frame. The numerals 126 and 127 represent two intermeshing gear wheels or pinions of the same size secured respectively to the motor shaft 92 and counter shaft 124, as shown in Fig. 3, whereby these shafts are caused to turn in opposite directions. It follows therefore that when the belt 120 is tigthened and the belt 121 is loosened, then the gear pinions 111 will be turned in one direction, while upon loosening the belt 120 and tightening the belt 121, said gear wheels 111 will be turned in the opposite direction, but when both of these belts 120, 121 are loose then no motion will be transmitted to the gear pinions 111 and the gear racks and the parts associated therewith will remain at rest.

The tightening and loosening of the belts 120, 121 is preferably effected by means which comprise a rock shaft 128 which is arranged horizontally and transversely in rear of the barrel supporting part of the base and journaled in bearings which are arranged on the base and which may be of any suitable character, and tightener arms 129, 130 projecting in opposite directions from the rock shaft 128 and provided with tightening pulleys 131 and 132 respectively, which are adapted to bear against the belts 120 and 121. In the central position of the rock shaft 128, both tightener pulleys 131 and 132 are disengaged from the belts 120 and 121 so that no motion is transmitted from the motor shaft 92 to the mechanism which raises and lowers the main cross head 108. Upon rocking the shaft 128 in the direction for engaging the tightener pulley 132 with the belt 121 and still holding the other tightener pulley 131 out of engagement from the belt 120, then motion will be transmitted from the motor shaft 92 to the gear racks 109 so as to move the cross head 108 and the parts mounted thereon downwardly. Upon rocking the shaft 128 in the opposite direction so as to disengage the tightener pulley 132 from its companion belt 121 and engaging the tightener pulley 131 with its companion belt 120, then motion will be transmitted from the motor shaft 92 to the gear racks 109 for the purpose of raising the cross head 108 and associated parts mounted thereon.

The turn of the rock shaft 128 in either direction from a central or neutral position is effected by means of a hand lever 133 which latter is so connected with this shaft 128 that the same will normally remain in its central or neutral position and must be forced by manual pressure downwardly if it is desired to lower the main cross head, and to be forced upwardly manually out of its neutral position when it is desired to raise the main crosshead.

During the descent of the cross head 108 the first part of this motion is utilized to complete the driving of the upper bilge hoop on the shell and the second part of this movement is utilized for completing the driving of the upper end hoop on the same. If it is desired, the bilge hoop may be either a permanent or temporary truss hoop but for the present purposes this distinction can be disregarded as the use of a temporary or permanent hoop is a matter which is governed by choice and by differing conditions.

The numeral 156 represents a plurality of upright driving arms which are arranged in in annular row around the cross head 108 and each of which is pivoted thereto at its opposite end by means of a horizontal pivot bolt 157 so that the driving die or jaw 158 at the lower end of each driving arm may be moved toward and from the periphery of the barrel shell or body, and into and out of engagement with the upper edge of the upper bilge hoop. The several driving arms are moved inwardly preparatory to engaging with the bilge hoop during the descent of the main cross head by means of a rotary crank disk 159 journaled to turn about a vertical sleeve 160 mounted vertically in line with the axis of the barrel shell when the same is in its normal operating position on the main base 75.

This crank disk is provided with a plurality of crank pins 161 each of which is connected with the inner end of a shifting rod 162. The outer end of each shifting rod is yieldingly connected with one of the driving arms below the fulcrum of the latter by slidingly engaging the outer part of each rod 162 with its guide lugs 163 on the respective driving arm, and interposing a spring 164 between the inner guide lug 163 and the inner side of a collar 165 on the respective shifting rod. Upon turning the driving disk 159 by means of a handle 166 in one direction, the several crank pins 161 on this disk will cause the shifting rods 162 to draw the driving arms 156 inwardly and engage the periphery of the barrel immediately above the upper bilge hoop thereon.

Figure 6:
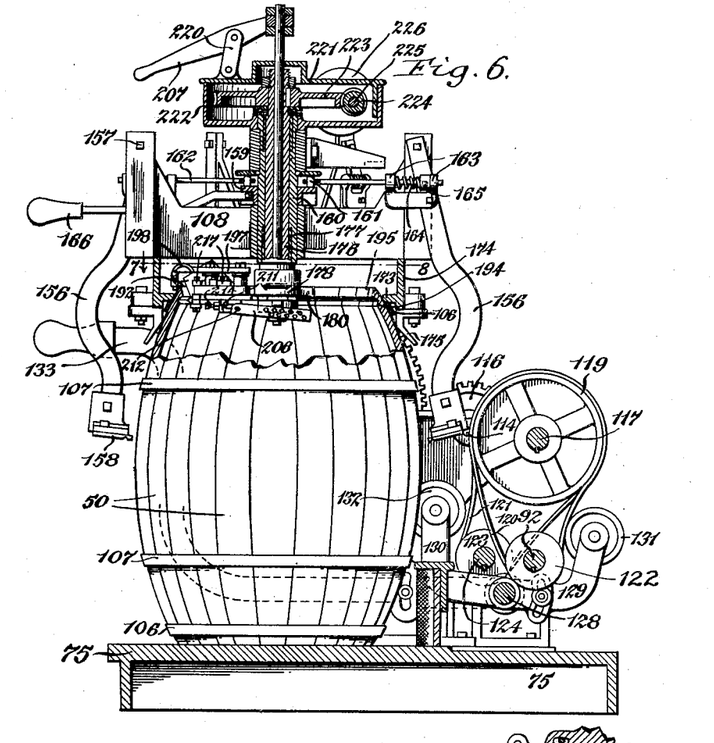
Fig. 6 is a section similar to Fig. 5, but showing the crozing, chamfering and trimming mechanism in its operative position.
Figure 7:
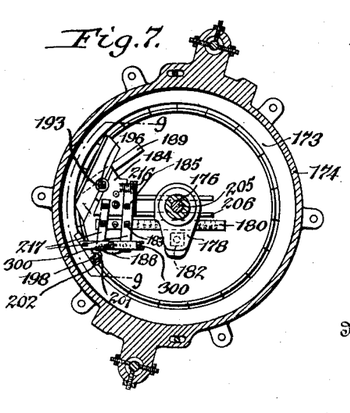
Figs. 7 and 8 are horizontal sections taken on line 7—8, Fig. 6, showing the crozing, chamfering and trimming mechanism in its operative and inoperative positions, respectively.

After the operator has turned the crank disc 159 so as to shift the driving dies or jaws into the proper position relative to the periphery of the barrel, the operator works the lever 133 so as to cause the cross head to descend whereby the dies or jaws of the driving arms are caused to engage the upper edge of the bilge hoops and drive the same downwardly on the shell or body of the barrel until it is tight, after which the operator reverses the throw of the crank disk 159 and causes the driving dies or jaws 158 to be disengaged from the bilge hoop. Thereafter the operator again manipulates the controlling lever 133 so as to cause the cross head to effect the second and final part of its downward movement for the purpose of engaging a driving ring or flange 173 with the upper edge of the upper temporary or truss hoop, as shown in Fig. 6.

This driving ring is formed on the inner lower part of a circular rim 174 which is secured to the underside of the main cross head 108. During the last step of this descending movement of the main cross head, the upper end of the barrel is centered by engagement therewith of a plurality of downwardly diverging centering fingers 175 secured to the lower edge of the supporting rim 174 and adapted to engage with the upper peripheral barrel shell or body, as shown in Fig. 6. During the final portion of the downward movement of the cross head, the driving arms and the driving dies or jaws at their lower ends are disengaged from the adjacent bilge hoop and move idly downwardly beyond this hoop, so that only the driving ring 173 at this time performs any function.

*Crozing, chamfering and trimming mechanism*

While the main cross head or carrier 108 is in its lowermost position and the barrel is being held in its centered position by engagement of the driving hoop ring 173 with the upper end hoop, the operator brings into action the mechanism which cuts a croze and chamfer on the upper end of the barrel shell and also trims off this end, which mechanism, is constructed as follows:

The numeral 176 represents an upright hollow shaft which is journaled in a bearing 177 arranged centrally on the cross head 108 and in axial alignment or concentrical with the axis of the barrel shell which is to be operated upon. At its lower end, this shaft is provided with a laterally projecting arm 178, the underside of which is provided with a notch 179. In this notch is adjustably secured a supporting member 180 having the form of a bar which can be slid tangentially relatively to the axis of the shaft 176 for the purpose of bringing parts which are mounted on the outer end of this bar into position with reference to the barrels of different sizes or diameters.

After adjustment this bar or supporting member 180 is secured in place by means of a clamping plate 181 bearing against the underside of this bar and secured to the arm 178 by means of a clamping bolt 182. Upon the outer end of this supporting bar 180 are mounted two pairs of parallel levers 217 which are adapted to turn about vertical axes so that their movement is in planes at right angles to the axis of the vertical shaft 176.

Figures 9, 10, 11, 12, 13, 14, 15, 16, 17:
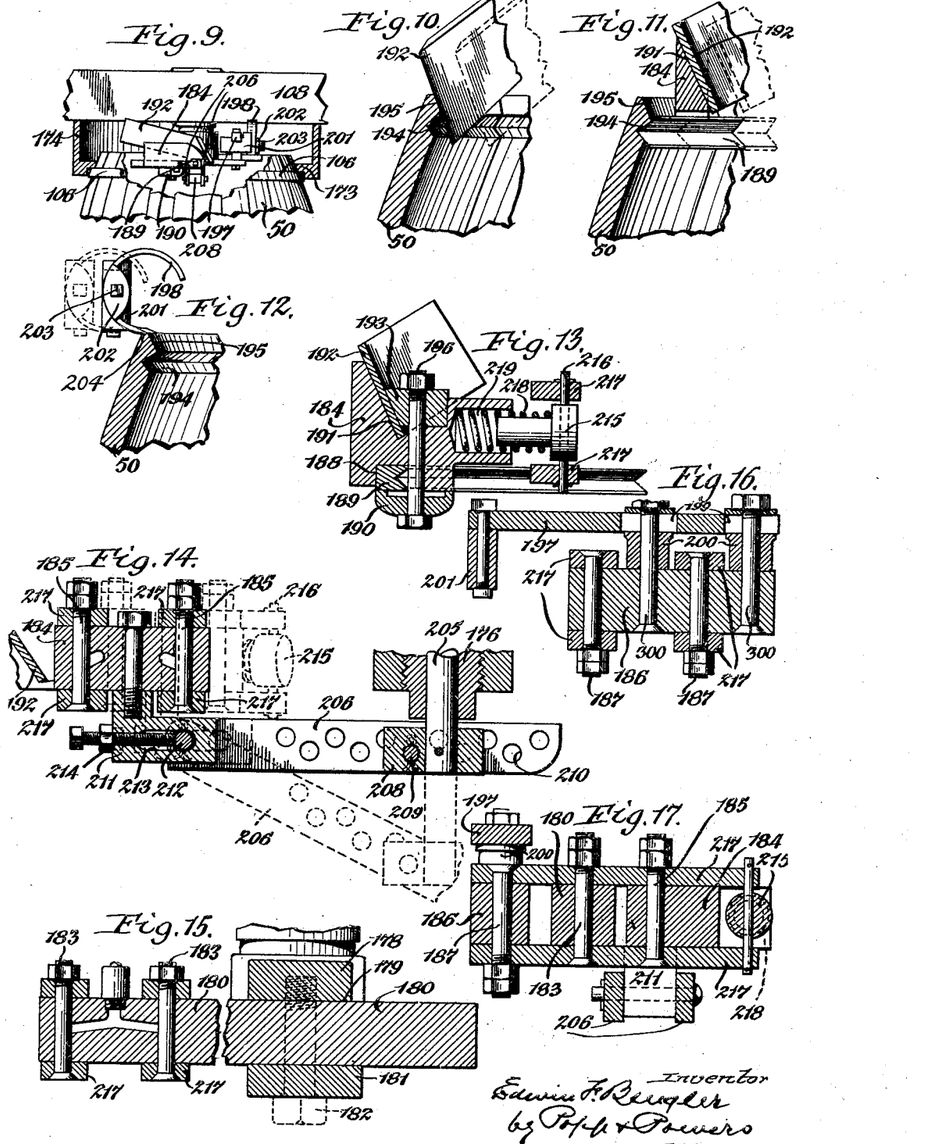
Fig. 9 is a fragmentary vertical section taken on the correspondingly numbered line in Fig. 7.
Figs. 10, 11, 12, 13, 14, 15, 16 and 17 are fragmentary vertical sections, on an enlarged scale, taken on the correspondingly numbered lines in Fig. 4.

In the preferred construction a pair of these levers is arranged on the upper side of the bar 180 and another pair on the underside of the same and the corresponding levers are connected by pivot pins 183 with the supporting bar 180, as best shown in Fig. 15. Between the corresponding arms on one side of these levers is arranged a parallel block 184 which is pivotally connected therewith by means of vertical pivot pins 185 and between the opposite arms of these levers is arranged another parallel block 186 which is pivoted thereto by means of vertical bolts 187 as shown in Fig. 16. These parallel levers 217 and blocks therefore form a double parallelogram which causes these blocks to always remain in a parallel position with reference to each other upon swinging the parallel levers 217 horizontally.

On the underside of the parallel block 184 the same is provided with a seat 188 against which a croze cutter 189 is adapted to be clamped by means of a clamping block 190, as shown in Fig. 13, and on its upper side this parallel block is provided with a seat 191 against which a chamfer cutter 192 is held by means of a clamping block 193, as shown in the same figure. The croze cutter is preferably constructed in the form of a gouge or gouging bit which is of substantially V-shape form in cross section so that upon engaging the inner side of the shell adjacent to the end thereof, a croze 194 will be cut in the shell, as shown in Fig. 11. The cutter or blade 192 is flat and inclined upwardly and also tilted laterally so that when its front cutting edge engages with the inner side of the barrel shell between the croze 194 and the end of the barrel a chamfer 195 will be formed on the shell, as best shown in Fig. 10.

The two clamping blocks 190, 193 are firmly drawn against the outer sides of the cutters 189 and 192 by clamping bolts 196 passing through these blocks and the parallel block 184, upon which these cutters are mounted, as shown in Fig. 13.

Upon the upper side of the other parallel block 186 is mounted the inner end of a cutter supporting bar 197 which latter supports at its outer end a cutter or blade 198 which is adapted to trim or cut off the end of the barrel shell for the purpose of finishing the same, as shown at 204 in Fig. 12, and establishing the correct length and height thereof.

In order to permit of adjusting this edge trimming knife 198 for adapting the machine to cut barrels of different diameters, the supporting bar 197 is mounted adjustably on the parallel block 186, this being preferably accomplished by means of adjusting bolts 300 passing through the parallel block 186 and through longitudinal slots 199 in the supporting bar 197, spacing sleeves 200 being mounted on the clamping bolts 300 between the upper side of the parallel block 186 and the underside of the supporting bar 197, as shown in Fig. 16, for the purpose of avoiding interference between these several members.

In its preferred construction the end trimmer is made in the form of the letter C in order to permit a cutter of sufficient length to be employed which can be placed in the narrow space available for this purpose and still provide sufficient length of cutter which will permit of advancing the same as its front cutting edge becomes worn and requires repeated sharpening. For this purpose the end trimming cutter is mounted on a cutter block 201 so that the same is capable of adjustment about the axis or center of its curvature, whereby this cutter on being turned about this axis can be adjusted so as to bring its front or cutting edge in the proper position relative to the edge of the barrel and thus permit of compensating for wear and sharpening which is required from time to time. This end cutter is firmly held in its operative position on the cutter block 201 by means of a clamping block 202 and a clamping bolt 203 whereby this cutter block 201 and clamping block 202 are firmly drawn against opposite sides of this end cutter, as shown in Figs. 9 and 12.

Figure 8:
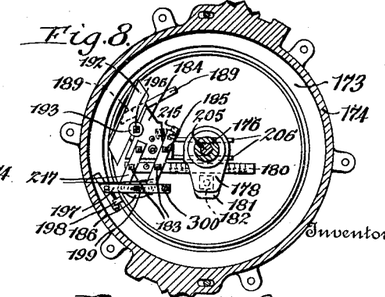

While the cross head 108 is being lowered over the upper end of the barrel shell, the parallel levers are turned so that the croze and chamfer cutters are moved inwardly and the edge trimming cutter is moved outwardly, in which position these cutters will clear the edge of the barrel shell, inasmuch as the croze and chamfer cutters are at this time arranged on the inner side of the barrel shell and the trimming cutter on the outer side of the same, as shown in Fig. 8. Upon turning the parallel levers 217 in the opposite direction, the croze and chamfer cutters will be engaged with the inner side of the barrel shell at the upper end thereof and the end trimming knife or cutter 198 will be moved inwardly across the upper end of the barrel shell, whereby these cutters upon being rotated with the shaft 176 will simultaneously operate to produce the croze, chamfer and end trim on the barrel shell.

This movement of the parallel levers 217 for the purpose of shifting the cutters into and out of their operative position may be effected in various ways, but preferably by the means which are shown in the drawings and which comprise a vertically moving shift rod 205 which slides within the bore of the shaft 176, a shifting linkage 206 pivotally connected at its inner end with the lower end of the shifting rod 205 and pivotally connected at its other end with the parallel block 184, and a hand lever 207 operatively connected with the upper end of the shifting rod 205. When the shifting rod 205 is in its lowered position the linkage 206 operates to draw the parallel block 184 and the cutters 192 and 189 inwardly away from the end of the barrel shell and the end trimmer 198 outwardly away from this shell, but when the shifting rod 205 is raised into the postition indicated by full lines in Fig. 14, the parallel levers 217 and blocks are shifted in the direction for moving the croze and chamfer cutters outwardly and the trimming cutter inwardly into the operative positions.

The preferred construction of the linkage 206 comprises two separate links which are arranged on opposite sides of a coupling block 208 which is secured to the lower end of the shifting rod, these links being pivotally connected with this block and also capable of lengthwise adjustment thereon by means of a pin 209 passing through different pair of corresponding holes 210 arranged at different points in the length of the linkage 206. At their outer ends the links 206 are arranged on opposite sides of the coupling block 211 which is secured to the underside of the parallel block 184, the connection between these links and the coupling block 211 being effected by means of a pivot pin 212 passing horizontally through the links 206 and through a slot 213 in the coupling block 211 and also bearing against an adjusting screw 214 arranged on the block 211, as shown in Fig. 14.

By this means an adjustment of the cutter mechanism with reference to its actuating or shifting mechanism may be effected for the purpose of adapting the cutters for operating on barrel shells of different diameters, a coarse adjustment being first effected by shifting the pivot pin 209 from one set of holes 210 to another and then following this with a fine adjustment which is accomplished by turning the screw 214 in one direction or the other. This screw 214 is constantly held against the pivot pin 212 by a spring return device which also operates to move the cutter blades away from the end of the barrel whenever the downward pull upon the hand lever 207 is released and the shifting rod 205 is permitted to drop into its inoperative position by gravity.

This spring device as best shown in Fig. 13 preferably consists of a swivel 215 which is pivotally mounted by means of a pin 216 on extensions of two of the parallel levers 217 and a spring 218 bearing at one end against this swivel 215, while its opposite end bears against the bottom of a socket 219 formed on the adjacent part of the parallel block 184. When the cutter mechanism is operated to engage the blades with the end of the barrel then the spring 218 is placed under increased tension and when the cutter mechanism is released by dropping of the shifting rod 205 and releasing of the hand lever 207, then the resilience of the spring 218 operates to move the cutter mechanism in the direction for disengaging the blades from the end of the barrel.

The hand lever 207 may be supported in any suitable manner but preferably by means of a link 220 which is mounted on the cover 221 of a casing 222 arranged above the upper end of the shaft 176 and forming in effect a part of the cross head 108 upon which it is mounted, as best shown in Figs. 5 and 6.

Figure 1:
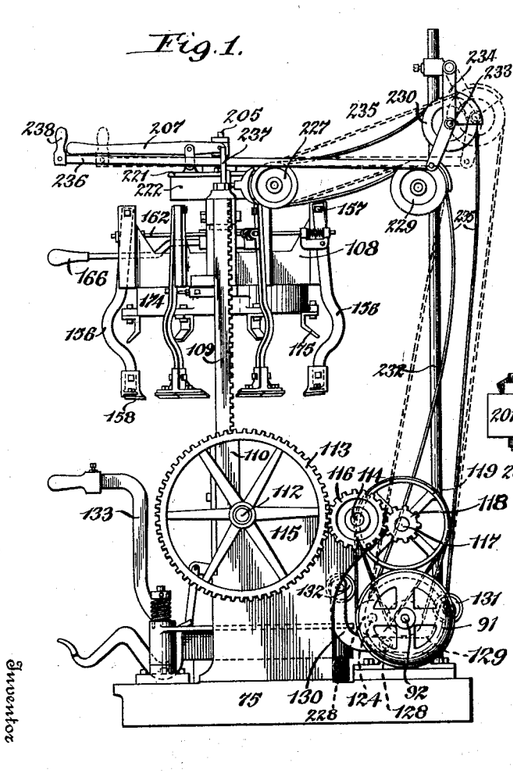
Fig. 1 is a side elevation of the barrel making machine embodying my improvements and showing the parts in an inoperative position.
Figure 2:
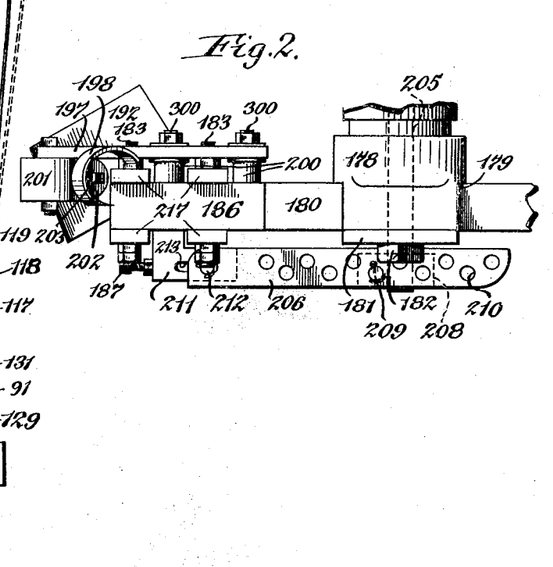
Fig. 2 is a side elevation of the cutter mechanism on an enlarged scale.

While the cutter mechanism is lowered upon the upper end of the barrel and its blades are moved into engagement therewith, a rotary movement is imparted to the shaft 176 so as to cause these blades to cut the croze and chamfer on the barrel shell and trim the end thereof. For this a manually controlled driving mechanism is employed whereby motion is transmitted from the motor shaft 92 to the driving shaft 176 of the cutter mechanism. This driving mechanism in its preferred form and as shown in Figs. 1, 3 and 6 is constructed as follows:

The numeral 223 represents a worm wheel secured to the upper end of the cutter shaft 176 within the housing 222, and the numeral 224 represents a worm meshing with said worm wheel and mounted upon a shaft 225 which is journaled in suitable bearings on the adjacent part of the casing 222. At one end of this worm shaft 225 is provided a hand wheel 226 whereby the same may be turned by hand while adjusting or setting up the cutter mechanism and on its opposite end this shaft is provided with a driven pulley 227 which is adapted to receive power from the motor shaft 92.

The numeral 228 represents a driving pulley mounted on the motor shaft 92, and 229 and 230 represent two intermediate pulleys arranged above the motor shaft 92 and in rear of the main cross head and the cutter shaft 176 journaled thereon. The lower intermediate pulley 229 is journaled on a bearing mounted on the upper end of a post or rod 232 which rises from the adjacent part of the base 75, and the upper intermediate pulley has its axle 233 suspended by means of a link 234 on the upper end of this post. The numeral 235 represents a driving belt passing with its lower turn around the driving pulley 228 and with its upper turn around the driven pulley 227, while the intermediate part of one of its stretches passes over the lower intermediate pulley 229 and the intermediate part of its other stretch passes around the other intermediate pulley 230. The upper intermediate pulley 230 serves as a belt tightener with reference to the belt 235 so that by moving this pulley 230 downwardly into a position in which it leaves this belt slack, as shown by full lines in Fig. 1, then no power will be transmitted from the motor shaft 92 to the cutter shaft 176, but when this tightener pulley 230 has swung backwardly and upwardly the driving belt 235 will be tightened, as shown by dotted lines in Fig. 1, and thereby cause motion to be transmitted from the motor 91 to the cutter mechanism. The intermediate tightener pulley 230 is moved into and out of its operative position for tightening or loosening the belt 235 by means of a shipper rod or bar 236 guided midway of its ends in a bracket 237 arranged on the upper side of the cross head 108 and provided at its front end with a handle 238 while its rear end is connected with the lower end of the link 234 which supports the tightener pulley 230. Upon pushing the shipper rod or bar 236 backwardly the belt 235 is tightened for causing the cutter mechanism to operate, and upon moving this bar forwardly this belt is loosened and the cutter mechanism ceases its operation.

After the bilge and end hoop have been driven on one end of the barrel shell and the crozing, chamfering and trimming operations have been performed on the respective end of the same, the barrel shell is reversed end for end and similar operations are performed on the other end of the barrel shell which is now uppermost, while the reversed finished end is now resting on the base 75 of the machine.

I claim as my invention:

1. A barrel making machine, comprising a support for a barrel shell, a carrier movable toward and from the end of said shell, a shaft rotatable on said carrier concentric with the axis of said shell, a supporting member arranged on said shaft, a rock lever pivotally mounted on said member to swing at right angles to the axis of said shaft, a cutter mounted on said rock lever and movable toward and from the end of said shell, and means for turning said rock lever including a shifting member extending lengthwise of said shaft, and a link connected with said shifting member and with said rock lever.

2. A barrel making machine, comprising a support for a barrel shell, a carrier movable toward and from the end of said shell, a longitudinal shaft journaled on said carrier concentrically with the axis of said shell, a supporting member arranged on said shaft, a rock lever pivotally mounted on said member on one side of the axis of said shaft and having arms turning in opposite directions toward and from the end of said shell and cutters mounted on said arms and adapted to move in opposite directions toward and from the end of said shell.

3. A barrel making machine, comprising a support for a barrel shell, a carrier movable toward and from the end of said shell, a longitudinal shaft journaled on said carrier concentrically with said shell, a supporting member arranged on said shaft, parallel levers pivoted on said member to turn at right angles to the axis of said shaft, a supporting block connected by parallel pivots with the moving ends of said levers, a cutter mounted on said block and movable toward and from said shell, means for turning said levers in the direction for carrying said cutter laterally toward the end of the shell, and spring means for turning said levers in the opposite direction.

4. A barrel making machine, comprising a support for a barrel shell, a carrier movable toward and from the end of said shell, a longitudinal shaft journaled on said carrier concentrically with said shell, a supporting memmer arranged on said shaft, parallel levers pivoted on said member to turn at right angles to the axis of said shaft, a supporting block connected by parallel pivots with the moving ends of said levers, a cutter mounted on said block and movable toward and from said shell, means for turning said levers in the direction for carrying said cutter laterally toward the end of the shell, and spring means for turning said levers in the opposite direction, consisting of a swivel pivoted on said levers, and a spring interposed between said swivel and said block.

5. A barrel making machine, comprising a support for a barrel shell, a carrier movable toward and from the end of the barrel, a longitudinal shaft journaled in said carrier concentric with the axis of said shell, a supporting member adjustably connected with the inner end of said shaft, a lever pivoted on said supporting member, a cutter mounted on said lever and movable toward and from the end of the barrel, and means for shifting said lever, including a shifting rod movable lengthwise in said shaft, an inner coupling block mounted on said rod, an outer coupling block mounted on said lever, a linkage, a coarse adjusting device connecting the inner end of said linkage within said inner coupling block, and a fine adjusting device connecting the outer end of said linkage with said outer coupling block.

6. A barrel making machine, comprising a support for a barrel shell, a carrier movable toward and from the end of the shell, a longitudinal shaft journaled on said carrier concentric with said shell, a supporting member arranged on the inner end of said shaft, a lever pivotally mounted on said support on one side of the axis of said shaft to swing transversely of the axis of said shaft, supporting blocks pivotally mounted on opposite arms of said lever, cutters for crozing and chamfering the end of the shell mounted on one of said blocks on one side of the axis of said lever, and a cutter for trimming the end of the shell mounted on the other of said blocks on the opposite side of the axis of said lever.

In testimony whereof I hereby affix my signature.

EDWIN F. BEUGLER.